United States Patent
Gaudfrin

[15] 3,682,306
[45] Aug. 8, 1972

[54] FILTERING INSTALLATION

[72] Inventor: Guy Gaudfrin, 67, rue de l'Assomption, Paris 16°, France

[22] Filed: Sept. 8, 1970

[21] Appl. No.: 70,534

Related U.S. Application Data

[63] Continuation of Ser. No. 780,389, Dec. 2, 1968, abandoned.

[30] Foreign Application Priority Data

Dec. 1, 1967 France....................67130653

[52] U.S. Cl....................210/96, 210/104, 210/107, 210/137, 210/333
[51] Int. Cl.........................B01d 29/36, B01d 29/42
[58] Field of Search........210/96, 101, 103, 104, 106, 210/107, 108, 137, 331, 333

[56] References Cited

UNITED STATES PATENTS

| | | |
|---|---|---|
| 1,644,469 | 10/1927 | Green....................210/104 X |
| 2,063,140 | 12/1936 | Allison....................210/96 X |
| 2,851,161 | 9/1958 | Mahlstrom et al.....210/137 X |
| 3,056,504 | 10/1962 | Lavallee.................210/333 X |
| 3,129,162 | 4/1964 | Jones......................210/101 X |
| 3,356,215 | 12/1967 | Miles, Jr................210/108 X |

Primary Examiner—John Adee
Attorney—Karl Ross

[57] ABSTRACT

In a system wherein a closed vessel is divided into several compartments, including a charging compartment and a washing compartment, which are successively traversed by an array of filter vanes rotating about an axis, air from a compressor maintains a constant pressure in the vessel whereas the pressure differential effective across the filter screens of the vanes is varied by regulators responsive to the rate of filtrand supply (in the charging compartment) and to the composition of the existing wash water (in the case of the washing compartment).

5 Claims, 1 Drawing Figure

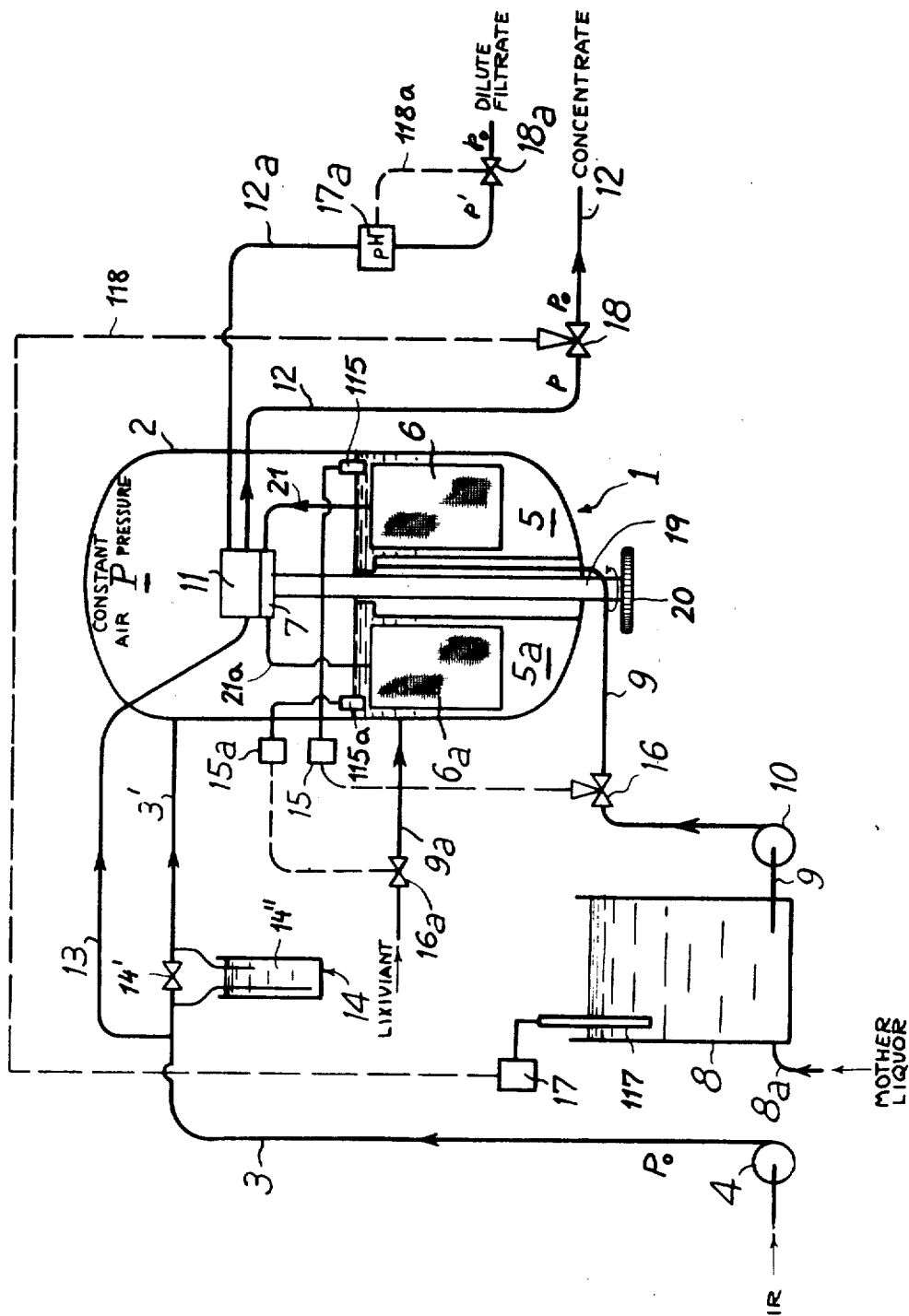

FILTERING INSTALLATION

This application is a continuation of application 780,389 filed Dec. 2, 1968, now abandoned.

My present invention relates to a filter installation of the type wherein a raw liquor is subjected to successive treatments in different filtering stages including a first or charging stage, in which concentrated filtrate is extracted from the mother liquor via a filter screen, and a second or washing stage in which a lixiviant, such as water or a highly diluted filtrate, is passed through the filter screen to entrain additional filtrate from a solid residue adhering to the screen surface. A system of this type has been described, with particular reference to sugar refining, in commonly owned U.S. Pat. No. 3,061,477.

The filtering elements of such a system are in the form of hollow bodies whose interior communicates with the outside through the narrow interstices of a filter screen forming at least one and preferably two major wall surfaces of the body. The filter members are generally in the form of flat vanes with vertical filtering surfaces forming part of a rotatable array, their interior communicating through respective conduits and a stationary distributing head with different outlets according to the angular position of the array. Thus, the system of the aforementioned U.S. patent comprises a vessel centered on a horizontal axis along which extends a rotary shaft carrying the filter vanes and the associated conduits. The lower part of this vessel defines a charging compartment through which the vanes pass during almost half a revolution, dipping into the mother liquor to be filtered; on emerging from the level of the filtrand, the vanes are subjected to sprays of lixiviant for the aforedescribed washing operation and are then scraped for a dislodgment of adhering filter cake.

In another commonly owned prior U.S. Pat., No. 3,056,504, there is shown a somewhat different filtering system wherein the shaft carrying the rotatable vane assembly is vertical rather than horizontal, the vanes lying in axial planes of the shaft and of the surrounding cylindrical vessel.

In a copending application filed on even date herewith, Ser. No. 780,398, now U.S. Pat. No. 3,540,597, I have disclosed a system generally similar to that of U.S. Pat. No. 3,056,504 wherein, however, the interior of the cylindrical vessel is subdivided into a plurality of treatment compartments by radial partitions, means being provided for hoisting each vane across the intervening partition on transiting from one compartment to the next. In such a system, therefore, the several compartments may be filled with different liquids, such as the aforedescribed mother liquor and lixiviant, up to a predetermined level which depends upon the height of the partitions and, together with the air pressure prevailing inside the vessel, establishes a substantially constant pressure differential across the filter screens if the associated conduits open into the atmosphere. In a system operating with a continuous though not necessarily constant supply of mother liquor and lixiviant, however, such a constant pressure differential across the filter screens is not always desirable. Thus, if the rate of supply of mother liquor is subject to major variations, the rate of extraction of filtrate should be varied accordingly in order to prevent either a backup in the supply line or a draining of the charging compartment. With a constant rate of lixiviant flow induced by this pressure differential, the concentration of filtrate in the resulting effluent tends to decrease progressively as the vane advances through the washing compartment and will also vary with different concentrations of mother liquor in a preceding charging compartment.

The general object of my present invention, therefore, is to provide means in such system for adapting this pressure differential, and therefore the rate of filtrate extraction in the charging stage and/or the rate of solubilization of extracts (e.g. sugar or juices) from the filter cake in the washing stage, to changing operating conditions as indicated above.

This object is realized, pursuant to my present invention, by the provision of adjustable throttle means in the outlet or outlets of the filter vanes passing through either or both of the aforementioned charging and washing compartments whereby the pressure differential developed across the filter screens of these vanes can be adjusted under the control of a regulator or regulators responsive to a parameter of the liquid in the corresponding compartment which is to be held substantially constant, the interior of the vessel being connected with an air compressor which maintains a substantially constant air pressure on the input side of the filter screens.

Such a system is applicable to a filtering installation of the type described in the above-mentioned U.S. Pat. No. 3,061,477 but is even more advantageous in conjunction with an upright filtering vessel according to U.S. Pat Nos. 3,056,504 and 3,540,597. With an apparatus of the latter type, in particular, the charging and washing compartments can be connected to a supply of mother liquor and a source of lixiviant, respectively, the mother liquor arriving by way of a storage tank whose level may be held constant by a regulator controlling a throttle in the associated outlet; the supply of lixiviant, on the other hand, may be varied to maintain a constant effluent concentration in the outlet of the washing compartment with the aid of a pH analyzer, conductivity meter or other sensor capable of detecting a property characteristic of the composition of the dilute filtrate.

The invention will be described in greater detail with reference to the accompanying drawing, the sole FIGURE of which shows diagrammatically an installation incorporating the features described above.

In the drawing I have shown a generally cylindrical vessel 1 with an upright axis, the envelope 2 of the vessel being sealed against the atmosphere so as to maintain an elevated air pressure P in its interior. Into this envelope opens an extension 3' of a conduit 3 which receives air under substantially constant pressure from a compressor 4. The lower part of vessel 1 is subdivided, by radial partitions not illustrated, into a plurality of compartments including a charging compartment 5, a washing compartment 5a and a discharge compartment not shown; for the details of construction, not relevant in connection with the present invention, reference is made to my above-identified U.S. Pat. No. 3,540,597.

A central shaft 19, carrying an array of radially extending and peripherally equispaced vanes of which only two diametrically opposite vanes 6, 6a have been illustrated, is unidirectionally rotatable about a vertical axis under the control of an intermittent driving mechanism diagrammatically illustrated by a ratchet wheel 20; the top of this shaft carries a collector disk 7 which is connected to the interior of filter vanes 6 and 6a via flexible conduits 21 and 21a. A stationary distributor head 11 has outlet pipes 12, 12a which alternately communicate with these conduits, pipe 12 receiving the discharge of any conduit 21 whose associated vane 6 occupies the charging compartment 5 while pipe 12a is connected to conduit 21a of any vane 6a in washing compartment 5a.

A vertically shiftable assembly of hoisting arms, not shown but fully described in U.S. Pat. No. 3,540,597, is synchronized with the drive 20 to lift each vane 6, 6a across an intervening partition to facilitate its transition from one compartment to the next.

Between the inlet tube 3 and its extension 3' there is inserted a hydraulic pressure-reducing valve 14 including a throttle 14' bridged by a liquid column 14" into which the conduits 3, 3' are immersed to different levels. With the output pressure $P_o$ of compressor 4 slightly exceeding that of the head of liquid overlying the submerged outlet of tube 3, and with throttle 14' acting to step down this output pressure to a superatmospheric pressure slightly above the constant pressure P corresponding to the head of liquid which overlies the submerged end of tube 3', excess air will escape through the liquid column so that the desired pressure P is maintained inside envelope 2 of vessel 1. The higher output pressure $P_o$ of compressor 4 is delivered through a branch conduit 13 to distributor head 11 for transmission to the flexible conduit 21 or 21a of filter member 6 or 6a when the latter is in the discharge compartment, thereby reversing the pressure differential across the filter screen thereof to purge these screens from any adhering solids which are then dumped into a drain where they may be comminuted and possibly mixed with added liquid into a slurry as described in the aforementioned prior U.S. patents.

A throttle 18 in the outlet end of conduit 12, assumed to discharge into the atmosphere, establishes a pressure $p$ somewhat higher than atmospheric, but lower than the internal air pressure P, in the conduit ahead of the throttle. The differential $p-p_o$ ($p_o$ being the atmospheric pressure) determines the rate of extraction of concentrated filtrate from compartment 5 via the screens of vanes 6 and can be adjusted through a connection 118 from a regulator 17. This regulator, through a sensor 117, measures the liquid level in a storage tank 8 which receives mother liquor from a source not shown through an inlet 8a and whence this liquor is discharged through an outlet line 9 with a feed pump 10 into the compartment 5 of vessel 1. Line 9 includes another adjustable throttle 16 which is controlled by a regulator 15 having a sensor 115 to measure the liquid level in compartment 5. A source of water or other lixiviant is connected via another feed line 9a with compartment 5a and contains an adjustable throttle 16a controlled from a regulator 15a in response to the liquid level in compartment 5a as measured by a sensor 115a. Sensors 115, 115a and 117 may control conventional floats coupled mechanically or electrically with their respective regulators.

Conduit 12a is provided at its outlet with another adjustable throttle 18a controlled, via a linkage 118a, from a regulator 17a just ahead of throttle 18a to determine the composition of its effluent, i.e. of the dilute filtrate produced by the lixiviant from line 1a after flushing through the screens of vanes 6a and the adhering filter cake. Regulator 17a, which may measure for example the pH or the conductivity of the effluent, adjusts the throttle 18a so that the differential $p'-p_o$ developed thereacross varies the flow-through rate of the lixiviant in order to maintain the composition of the effluent substantially constant. Through the effect of level regulator 15a, changes in the flow rate through conduits 21a and 12a are translated into corresponding changes in the influx rate through inlet 9a. In an analogous manner, regulator 17 controls the discharge rate through conduits 21 and 12 which in turn, via level control 15, is transmitted to throttle 16 in inlet line 9 so as to stabilize the liquid level in tank 8 despite varying delivery rates at supply duct 8a.

The improvement described and illustrated can be used in any system wherein two or more compartments with different filtrands co-operate with a set of continuously or reciprocably rotatable filtering vanes under conditions requiring different discharge rates for the respective filtrates; the pressure differentials developed across the filter screens may also be established by letting the conduits 12, 12a open into regions of subatmospheric pressure, with atmospheric or near-atmospheric pressure reigning inside the vessel 1.

I claim:

1. In a filtration apparatus comprising a substantially cylindrical vessel centered on a vertical axis, a central vertical shaft rotatably journaled in said vessel, a set of vanes each having a flat hollow body disposed in an axial plane of said vessel and provided with a filter screen on at least one major vertical surface, said vanes being mounted on said shaft with freedom of vertical displacement between a normal position above said lower part, a plurality of radial partitions in said vessel dividing said lower part into several compartments concurrently receiving respective groups of said vanes, a fluid collector supported on said shaft, flexible conduits extending from said collector to said vanes and terminating at the interior thereof for communication with the surrounding compartments through the respective filter screens, a distributor head fixedly disposed in said vessel adjacent said fluid collector and provided with channels communicating with said conduits in different rotary positions of said shaft, drive means for progressively rotating said shaft in said vessel, and hoist means synchronized with said drive means for lifting each of said vanes into said elevated position upon the approach of any of said partitions and returning said vanes to said normal position upon transition to an adjoining compartment across the intervening partition, the improvement wherein said distributor head is provided with a plurality of outlet tubes communicating intermittently with respective compartments of said vessel by way of said channels and conduits leading to the vanes temporarily immersed in liquids contained in said compartments, said vessel having an upper part connected to a source of gas under substantially constant pressure for driving said liquids into the respective outlet tubes, said compartments having inlet connections to respective supplies of said liquids, one of said inlet connections being provided with sensing means for measuring the supply pressure of the corresponding liquid, the associated outlet tube being provided with regulator means coupled to said sensing means for varying the discharge rate of said corresponding liquid in response to variations in said supply pressure.

2. The improvement defined in claim 1 wherein said one of said inlet connections includes a storage tank receiving the corresponding liquid from its supply, said sensing means comprising a level sensor in said tank, said regulator means comprising adjustable throttle means for keeping the liquid level in said tank substantially constant.

3. The improvement defined in claim 1 wherein the liquids contained in said compartments include a mother liquor, fed in via said one of said inlet connections, and a lixiviant, delivered by another inlet connection, the outlet tube for said lixiviant being provided with a sensor for determining the composition of the discharged liquid and being further provided with adjustable throttle means controlled by said sensor for maintaining said composition substantially constant.

4. The improvement defined in claim 1 wherein said compartments are provided with respective floats, said inlet connections being provided with flow regulators respectively controlled by said floats for maintaining a substantially constant liquid level in each compartment.

5. The improvement defined in claim 1 wherein said source of gas comprises an air compressor and pressure-reducing means inserted between said compressor and said vessel.

* * * * *